United States Patent [19]
Citelli

[11] 4,042,076
[45] Aug. 16, 1977

[54] BRAKING SYSTEM

[76] Inventor: Charles Citelli, P.O. Box 162, Lexington, N.Y. 12452

[21] Appl. No.: 747,794

[22] Filed: Dec. 6, 1976

Related U.S. Application Data

[63] Continuation-in-part of Ser. No. 649,563, Jan. 15, 1976, abandoned.

[51] Int. Cl.² .............................................. B60T 1/04
[52] U.S. Cl. .................................... 188/80; 188/262
[58] Field of Search .............. 188/2 R, 80, 262, 271, 188/272

[56] References Cited

U.S. PATENT DOCUMENTS

| 1,004,218 | 9/1911 | Thomas | 188/262 |
| 2,704,138 | 3/1955 | Gibson et al. | 188/80 |
| 3,103,259 | 9/1963 | Gaines et al. | 188/80 X |

Primary Examiner—Duane A. Reger
Attorney, Agent, or Firm—John Maier, III

[57] ABSTRACT

A braking system for engaging a vehicle's wheel including a first braking step to retard the vehicle and a second braking step to halt the vehicle while still avoiding skidding.

11 Claims, 7 Drawing Figures

U.S. Patent  Aug. 16, 1977  Sheet 1 of 3  4,042,076
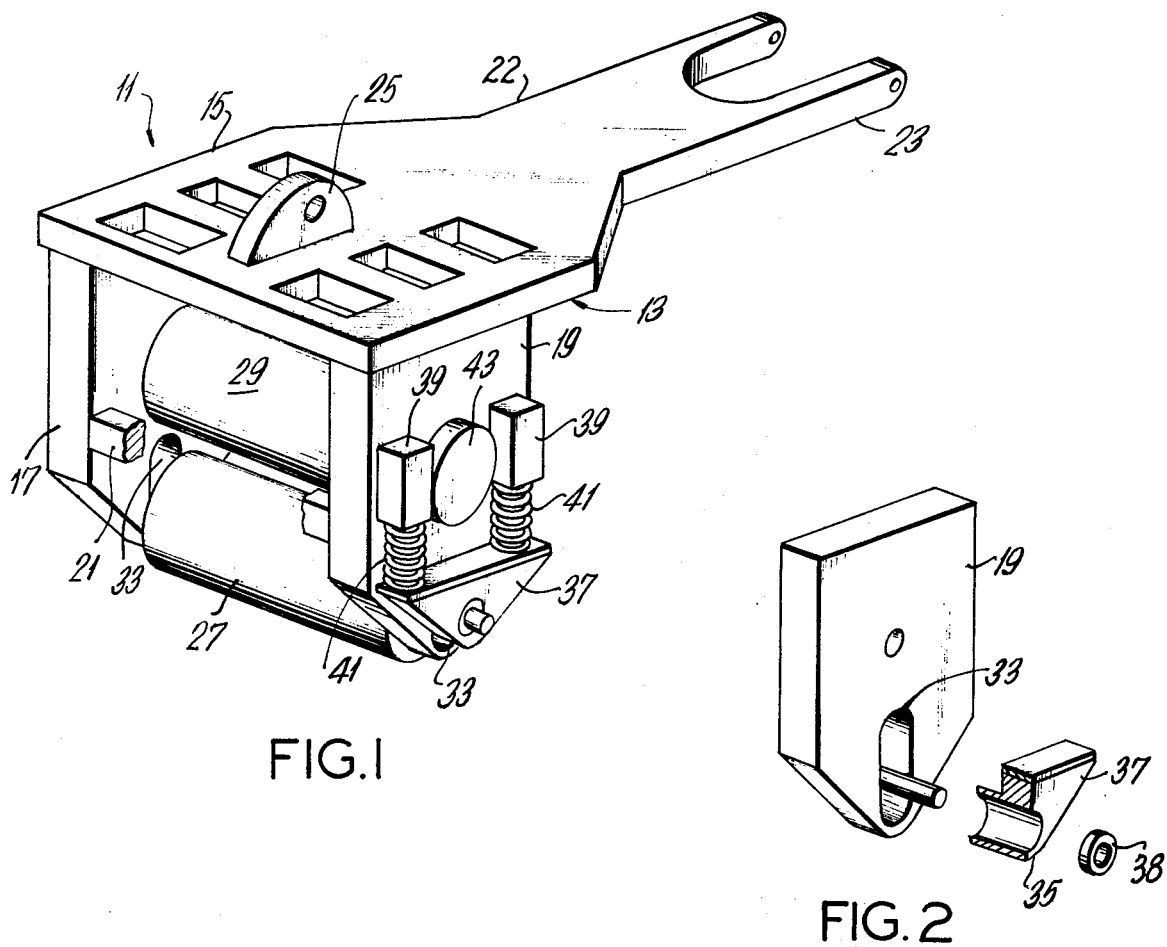
FIG.1
FIG.2
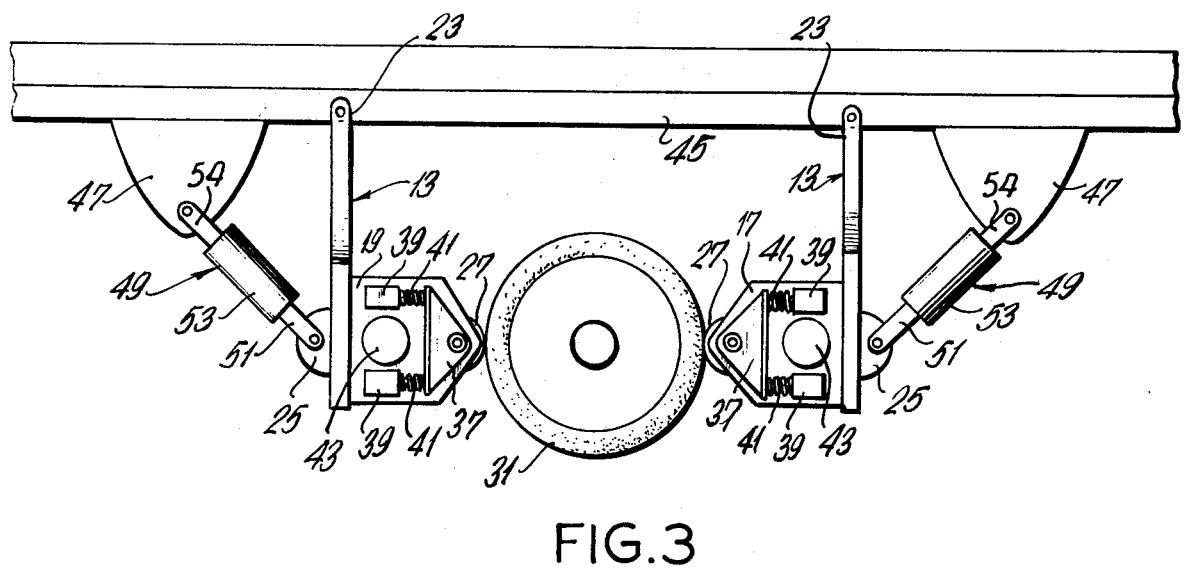
FIG.3

BRAKING SYSTEM

CROSS REFERENCE

This patent application is a continuation-in-part of application Ser. No. 649,563, filed Jan. 15, 1976 and entitled "Anti-Jackknife Device," now abandoned.

BACKGROUND OF THE INVENTION

In the operation of any vehicle such as a truck or bus, safety mandates the need for a second braking system. Most particularly, there is a need for a braking system which can be used during slippery conditions without causing the vehicle to skid. One specific example where skidding must be avoided is with a trailer truck where jackknifing can occur.

Emergency braking devices in the past have usually involved some type of brake shoe which directly engages the surface of the tire on the wheel. Such a device is useful to stop a runaway vehicle. The control of skidding, however, between the rod surface and the vehicle tire is not achieved by such a braking device and one braking operation will destroy the tire on the vehicle which is engaged by the brake shoe. In one device which attempted to avoid skidding, a second set of wheels were placed on the vehicle so that during slippery conditions, there would be twice the contact between the wheels and the road surface. Such a system, however, requires the vehicle to include a second set of retractable wheels, means for retracting such wheels and a means for synchronizing the retractable wheels with the regular wheels.

BRIEF SUMMARY OF THE INVENTION

In accordance with the present invention, a pair of braking units are pivotably suspended from the underpart of the vehicle. Each braking unit includes a housing and within each housing two rollers are located. The housing is suspended from the vehicle so that the outermost roller on each housing, when dropped down will engage the surface of the vehicle's tire. The second roller within the housing is located adjacent to but not engaged with the first roller. The first roller is mounted in a pair of slidable journals. Each slidable journal has a pair of springs to resist movement of the first roller toward the second roller. However, as increased pressure is applied through the hydraulic system, the first roller is pressed backwards and engages the second roller. A braking means functions with the second roller to resist rotation of the second roller. The braking means is preset to apply a perdetermined brake resistence to the second roller. In this way, when the second roller is pressed against the first roller which is pressed against the vehicle tire, the vehicle is brought to a stop in accordance with the degree of rotational resistance preset into the braking means. The degree of braking in the second roller is such that the vehicle tire will not slide on the pavement surface on which the vehicle is located.

A hydraulic system is provided for raising and lowering of the housing and for engaging the first roller against the tire and then the first roller against the second roller in the two-step manner previously described.

BRIEF DESCRIPTION OF THE DRAWINGS

The above brief description as well as further objects, features, and advantages of the present invention will be more fully appreciated by referring to the following detailed description of a presently preferred but none the less illustrative embodiment in accordance with the present invention, when taking a connection with the accompanying drawings wherein.

FIG. 1 is a perspective view of the braking unit utilized within the braking system.

FIG. 2 is a perspective view in partially exploded detail showing the side mounting of the outermost or first roller within the braking unit.

FIG. 3 is a side elevation showing a pair of braking units mounted on the undercarriage of a vehicle and in relationship to the vehicle wheel.

DESCRIPTION OF THE PREFERRED EMBODIMENT

Figure 4:
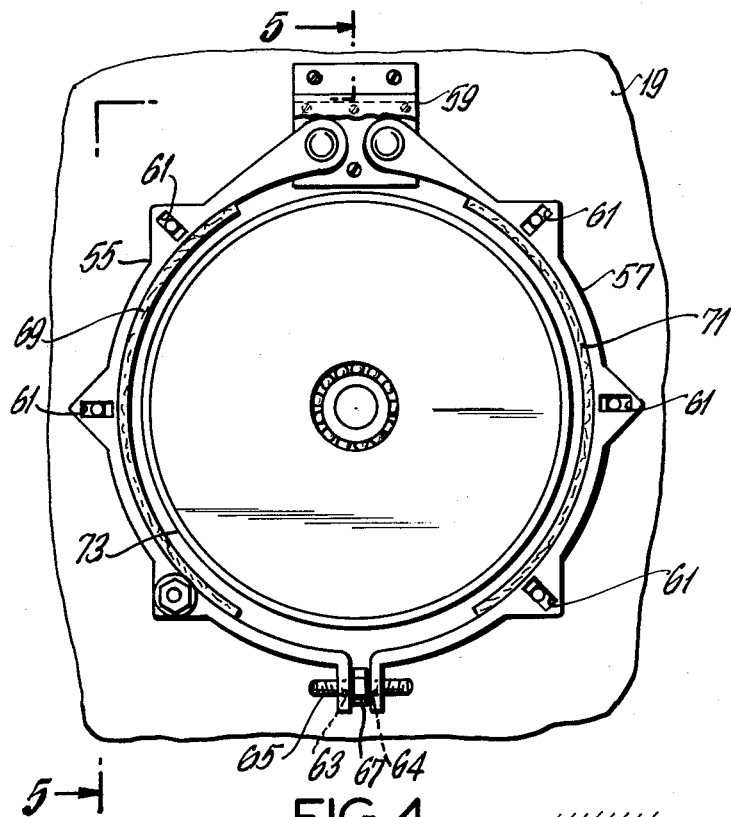
FIG. 4 is a front view of the brake shoe mechanism utilized with the inner or second roller.

FIG. 1 shows the braking unit used in accordance with the present invention. The braking unit 11 includes a housing 13 having a backplate 15 with two parallel side plates 17, 19 extending therefrom. A support member 21 parallel to the back plate 15 braces the two side plates 17, 19. The back plate 15 is extended beyond the side plates 17, 19 to from a mounting member 22. The mounting member 22 is forked at its outside end 23 so that the mounting member 22 may be pivotably mounted at its outside end 23 on the undercarriage of the vehicle. A protrusion 25 extends from the outside of the back plate 15 approximately midway between where the side plates 17, 19 are located. A pair of rollers 27, 29 are located between the side plates 17, 19. The surface of the outside or first roller 27 extends beyond the side plates 17, 19 so as to be able to engage the vehicle wheel or tire 31. The second or inside roller 29 is located toward the back plate 15 from the first roller 27 and in a spaced relationship from the first roller 27.

As best seen in FIG. 2, the second roller 29 is journaled directly through the side plates. For the first roller 27, there is located in each side plate 17, 19 an elongated slot 33. The first roller 27 is mounted in a pair of journals 35 each of which is located within a second or outside plate 37 which slidably engages the outside surface of the side plates 17, 19. Each of the journals 35 extends into the elongated or slotted opening 33 and is secured therein while being slidable along the elongated slot. Each second plate 37 is generally triangular in shape so as to be similar in shape to the end portion of the side plates 17, 19 on which the second plates 37 are slidably mounted. Bearings 38 are located within the journals 35 for the mounting of the first roller 27. Also mounted on each of the side plates 37 are two fixed stop members 39. Extending between each second plate 37 and the stop members 39 are springs 41 which force the second plate 37 away from the stop blocks. In this way, the first roller 27, because of the force of the springs 41, tends to be positioned in the elongated slot away from the second roller 29. The second roller 29 is not slidably mounted but only rotatably mounted within the side plates 17, 19. At each end of the second roller 29, on the outside of each side plate 17, 19, a braking mechanism 43 is located. The details of the braking mechanism 43 will be subsequently described herein.

Preferably two braking units 11, as shown in FIG. 3, are used with each wheel 31. This not essential, but obviously greater braking can be achieved in this way with less pressure against the tire 31. Therefore, there is greater certainty of not doing damage to the vehicle tire 31 thereby achieving greater safety. However, it is to be understood that the invention can be used with only one braking unit 11 per tire and not two as shown in FIG. 3.

As best seen in FIG. 3, the forked end 23 of the support member 21 is pivotably connected to the undercarriage or frame 45 of the vehicle in any suitable manner. Lugs 47 are attached to the undercarriage 45 of the vehicle adjacent where the forked end 23 of the support member 21 is pivotably mounted. A piston and cylinder assembly 49 including a piston 51 and cylinder 53 is located between the lug 47 and the protrusion 25, mounted on the back or outside of the back plate 15. A mounting rod 54 is provided at the end of the piston and cylinder assembly opposite from the piston 51.

It can now be readily seen that as the piston 51 of the assembly 49 is forced outward from the cylinder 53 by the application of fluid under pressure into the piston and cylinder assembly 49, the first roller 27 engages the surface of the wheel 31. However, unless further pressure is applied beyond that point only the first roller in each braking unit 11 will engage the vehicle wheel 31. Upon the application of further fluid pressure, the first roller 27 is forced against the tire with even greater force and the slidably mounted journals 35 and their respective outside plates 37 in which the first roller 27 is mounted will move backward overcoming the resistance of the springs 41. The first roller 27 will then engage the second roller 29. During the time that the first roller 27 is only engaging the tire 31, the resistance to rotation of the first roller 27 built into the slidable journals 35 is the sole braking effect which causes only a limited retardation of the movement of the vehicle. When, however, the first roller 27 engages the second roller 29, rotation of the second roller 29 is retarded to a preset degree by the braking mechanism 43. In this way, the vehicle is caused ultimately to stop but the degree of braking is only such that the wheel 31 of the vehicle being so braked will not skid in relationship to the surface on which it is riding. Obviously, the invention disclosed maybe used to stop the vehicle when the normal braking system fails. However, even when the normal braking system is in full operation, it is frequently desired to bring the vehicle to a stop in a pre-controlled manner so as to avoid skidding.

Figure 5:
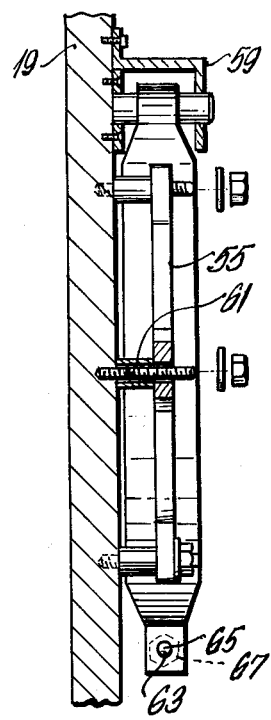
FIG. 5 is a cross-sectional view taken along lines 5—5 of FIG. 4.

Referring now to the FIGS. 4 and 5, showing the braking mechanism 43, a left brake band 55 and a right brake band 57 are each pivotably mounted on a mounting plate 59. Each mounting plate 59 is secured by any suitable means to its respective side plate 17, 19. Each of the brake bands 55, 57 has equally spaced along its outside surface slotted bolt holes 61 to permit adjustment of the brake bands 55, 57. At the point where the left brake band 55 and the right brake band 57 meet, each of the brake bands 55, 57 are bent outwardly at substantially right angles and threaded openings 63, 64 are provided through the brake bands 55, 57. A left and right threaded bolt 65 is inserted in both threaded openings 63, 64. An adjustment nut 67 which is a part of the bolt 65 is centrally located on the bolt 65 between the threaded openings 63, 64. In this way, the brake bands 55, 57 can be preset to the desired degree of braking.

Located on the inside of the left brake band 55 is a left brake lining 69. Similarly, located on the inside of the right brake band 57 is a right brake lining 71. Interior thereof is a brake drum 73. The brake drum 73 is fixably mounted on the inner or second roller 29. When a second roller 29 rotates, the brake drum 73 rotates with it, and is subject to the braking action of the brake shoes in accordance with the adjustments provided by the threaded adjusting bolt 65.

Figure 6:
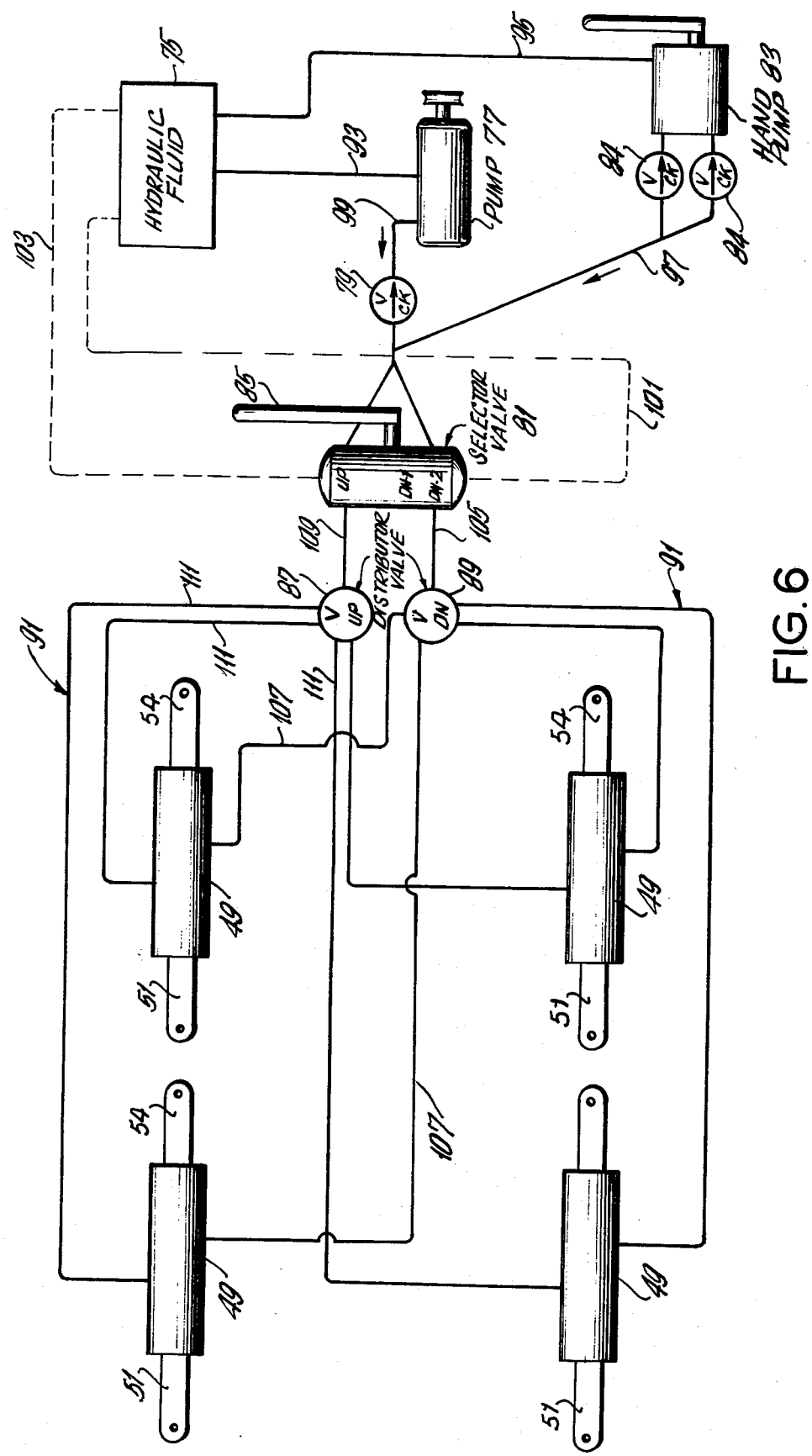
FIG. 6 is a schematic view of the hydraulic system used to actuate the pivoting and engagement of the braking unit.

Referring now to the hydraulic system shown in FIG. 6, a tank 75 is provided as a reservoir for hydraulic fluid. A pump 77, driven by the vehicle's engine, (not shown) is supplied fluid from the tank 75 and pressurizes the fluid to pass it through a check valve 79 to a selector valve 81. A hand-actuated pump 83 is also available to pump fluid from the tank. Should the engine-driven pump 77 fail, the hand pump 83 could be used by the operator in the cab. The check valve 79 prevents the flow of fluid from the hand pump 83 back into the engine-driven pump 77. Similarly, check valves 84 prevent fluid flow from the engine-driven pump 77 from entering the hand-actuated pump 83. Regardless of whether the hand pump 83 or power driven pump 77 is utilized, the fluid flows to the selector valve 81. A selector lever 85 is used to place either the brake unit or units, as the case may be, in either the up position or in one of two possible down positions. When the selector lever 85 is in the up position, fluid flows to one or more piston and cylinder assemblies 49 causing the pistons 51 to retract. The schematic shown in FIG. 6 is the particular arrangement when a pair of roller units are used on each of two rear wheels. Similar arrangements are made for differing number of braking units 11. An up distributor valve 87 and a down distributor valve 89 are used to distribute the fluid when more than one piston and cylinder assembly 49 is used. Conduits 91 are used to connect to various operative parts of the hydraulic system.

A conduit line 93 supplies fluid from the tank 75 to the power driven pump 77. A separate conduit line 95 supplies fluid from the tank 75 to the hand pump 83. Fluid flow from the hand pump 83 is conveyed through conduit 97 while flow from the power driven pump 77 is through line 99. Two check valves 84 are located in conduit line 97 since the hand pump 83 is a double action pump. A return line 101 and a return line 103 return fluid from the down position and up position respectively of the selector valve 81 to the tank 75.

From the down position of the selector lever 85 on the selector valve 81, fluid flows through conduit 105 to the down distributor valve 89 and thence through one or more lines 107 to the piston and cylinder assemblies 49. Similarly from the up position of the selector valve 81, fluid flows through conduit 109 to the up distributor valve 87 and thence through one or more lines 111 to the piston and cylinder assemblies.

When the selector lever 85 on the selector valve 81 is placed in the number one down position, a limited degree of fluid pressure is passed through the down distributor valve 89. All fluid pressure to the up distributor valve 87 and the up valve is released. In this way, the piston is extended to a limited degree from the cylinder so as to engage the first roller with the vehicle tire. However, when the selector lever 85 is in the number one down position, the fluid pressure is insufficient to cause the force of any piston 51 to overcome the resistance of the springs 41 thereby keeping the first roller 27 disengaged from the second roller 29.

When the selector lever 85 on the selector valve 81 is placed in the number two down position, full fluid pressure is applied forcing the pistons out further and overcoming the resistance of the springs 41 thereby causing the first roller 27 to be pressed firmly against the tire 31 and firmly against the second roller 29 thereby engaging the second roller 29. Rotation of the second roller 29 retarded to the extent of the braking action preset in the brake shoe assembly. As previously described, this braking action causes the vehicle to stop at a predetermined braking rate.

Figure 7:
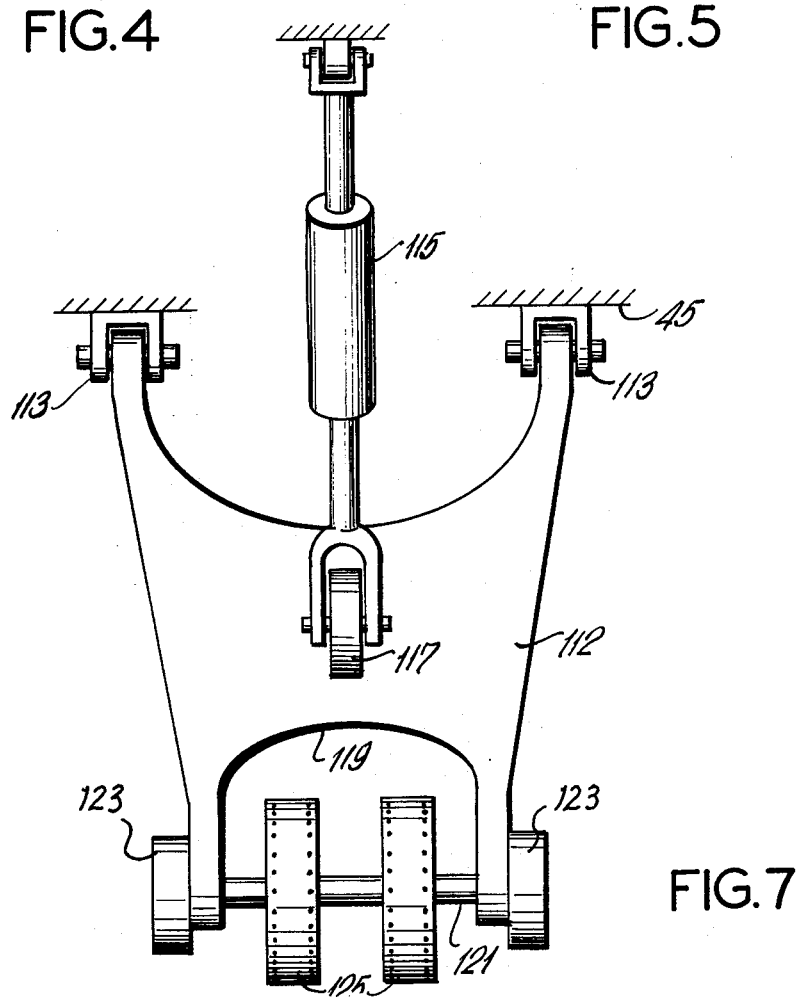
FIG. 7 is a front elevation of an optional unit to be used with the braking system.

In FIG. 7, an optional added unit 109 is shown. This unit engages the ground beneath the vehicle rather than the tire 31 of the vehicle. A frame 112 is pivotably mounted on the undercarriage 45 of the vehicle by mountings 113. A piston and cylinder assembly 115 is connected between the vehicle and a lug 117 mounted in the frame 112. When the selector lever 85 is placed in the number two down position the unit 109 is actuated by a conduit (not shown). Similarly, when the selector lever 85 is in the up position or the number one down position a conduit (not shown) supplies fluid to the piston and cylinder assembly 115 to maintain it in a retracted position. The lower end of the frame 112 is open forming a recessed area 119 in which an axle 121 is rotatably mounted. On each end of the axle 121 and mounted on the outside of the frame 112 are braking mechanism 123 which are the same as the braking mechanisms 43 previously described. Wheels 125, preferably studded, are mounted on the axle 121 and rotate with the axle 121. The braking mechanisms 123 are preset to retard the rotation and ultimate stop the rotation of the wheels 125 thereby assisting in the braking of the vehicle.

A latitude of modification, change and substitution is intended in the foregoing disclosure and in some instances some features of the invention will be employed without an corresponding use of other features. Accordingly, it is appropriate that the appended claims be construed broadly and in an manner consistent with the spirit and scope of the invention herein.

I claim:

1. A braking system for a vehicle mounted on wheels comprising:
   a first roller;
   a second roller;
   a housing means, said second roller being rotatably mounted in said housing means and said first roller being both rotatably and slidably mounted in said housing means to move to and from said second roller;
   resilient means mounted on said housing means for forcing said first roller away from said second roller;
   brake means operatively associated with said second roller for retarding the rotation of said second roller;
   means for mounting said housing means on a vehicle; and
   pressure means for frictionally engaging said first roller with a wheel mounted on the vehicle and for further forcing said first roller against said wheel so as to overcome the force of the resilient means and for frictionally engaging the first roller with the second roller.

2. A braking system according to claim 1 wherein: said housing means includes two side plates and a back plate, said two side plates being substantially parallel to one another and each being substantially at right angles to said back plate.

3. A braking system according to claim 2 wherein: said two side plates each have a circular opening aligned one with the other and each have an elongated slot aligned one with the other, the major axes of the elongated slot being aligned with the centerpoint of the circular opening on the sampe plate, a journal being slidably mounted in each of said elongated slots, each of said journals including an outside plate slidably mounted on the outside of the plate where the journal is mounted; and
   said resilient means includes a pair of springs on each of said two side plates fixedly mounted at one end and against the respective outside plate at the other end.

4. A braking system according to claim 1 wherein said brake means includes:
   a brake drum mounted on said second roller;
   a pair of brake linings;
   a pair of brake bands surrounding said brake drum, said brake linings being mounted on the inside of said brake bands; and
   means for presetting the force of contact between the brake shoes and the brake drum.

5. A braking system according to claim 4 wherein said means for presetting the force of contact between the brake shoes and the brake drum includes:
   a left and right handed bolt connecting the pair of brake bands.

6. A braking system according to claim 1 wherein the means for frictionally engaging the first roller with the wheel and the second roller with the first roller includes:
   an hydraulic piston and cylinder assembly connected to said housing means and said vehicle for moving said housing means to and from the wheel;
   a source of hydraulic fluid;
   a pump means for pressurizing said hydraulic fluid;
   a selectror valve for actuating said hydraulic piston and cylinder assembly; and selector
   conduit means for interconnecting said source of hydraulic fluid, said pump, said selector valve and said hydraulic piston and cylinder assembly, said selector valve controlling the flow of fluid through the conduit means to the hydraulic piston and cylinder assembly to determine the direction of movement of the housing means and the extent of force with which the first roller engages the wheel.

7. A braking system according to claim 2 wherein said means for mounting said housing means on the vehicle includes:
   an extension of said back plate, the end of said extension remote from said housing being adapted to be pivotably mounted on said vehicle.

8. A braking system according to claim 6 wherein said hydraulic piston and cylinder assembly is connected to said vehicle and said back plate so as to pivot said housing away from and toward the wheel of the vehicle.

9. A braking system according to claim 1 wherein:
   said housing means includes two substantially parallel side plates and a back plate, said side plates being rigidly affixed to said side plates;
   said resilient means includes springs mounted outside said side plates;
   said brake means includes a brake drum mounted on said second roller and brake bands and brake shoes frictionally engagable with said brake drum;

said means for mounting said housing means on the vehicle includes an elongated extension of said back plate; and said pressure means includes a hydraulic system with a hydraulic piston and cylinder assembly extending between the vehicle and said housing means.

10. A braking system according to claim 9 wherein said hydraulic system further includes:
a source of hydraulic fluid;
a pump means for pressurizing said hydraulic fluid;
a selector valve for controlling the direction of flow of the hydraulic fluid within said hydraulic piston and cylinder assembly; and the degree of pressure of the hydraulic fluid within said hydraulic piston and cylinder assembly when the first roller is being pressed against the wheel; and
conduit means for interconnecting said source of hydraulic fluid, said pump, said selector valve and said hydraulic piston and cylinder assembly.

11. A braking system according to claim 1 further including:
a second housing means;
means for mounting said second housing means on said vehicle;
wheels means rotatably mounted in said second housing means;
second brake means operatively associated with said wheel means; and
second pressure means for frictionally engaging said wheel means with the surface in which the vehicle is located.

* * * * *